United States Patent [19]
Ishibe

[11] Patent Number: 5,859,720
[45] Date of Patent: Jan. 12, 1999

[54] SCANNIING OPTICAL APPARATUS

[75] Inventor: Yoshihiro Ishibe, Kawasaki, Japan

[73] Assignee: Canon Kabushiki Kaisha, Tokyo, Japan

[21] Appl. No.: 852,955

[22] Filed: May 8, 1997

[30] Foreign Application Priority Data

May 10, 1996 [JP] Japan .................................. 8-141001

[51] Int. Cl.$^6$ .................................................. G02B 26/08
[52] U.S. Cl. ...................... 359/196; 359/197; 359/212; 359/216
[58] Field of Search .................................... 359/196–226, 359/738–740; 347/256–261, 241–244

[56] References Cited

U.S. PATENT DOCUMENTS

| 5,245,481 | 9/1993 | Kaneko et al. | 359/218 |
|---|---|---|---|
| 5,546,216 | 8/1996 | Suzuki | 359/216 |
| 5,724,172 | 3/1998 | Ota | 359/206 |

FOREIGN PATENT DOCUMENTS

| 5-307151 | 11/1993 | Japan . |
|---|---|---|
| 6-148545 | 5/1994 | Japan . |

*Primary Examiner*—James Phan
*Attorney, Agent, or Firm*—Fitzpatrick, Cella, Harper & Scinto

[57] ABSTRACT

A scanning optical apparatus includes a light source, a deflector for deflecting a beam emitted from the light source, an optical device for guiding the beam emitted from the light source to the deflector, a stop member, provided in an optical path between the optical device and the deflector, for shaping a beam size of the beam having passed the optical device, the stop member having an aperture portion, an imaging device for guiding the beam deflected by the deflector onto a surface to be scanned, and a shade member, provided in the optical path between the stop member and the deflector, for intercepting a beam traveling in a central part of the stop member.

12 Claims, 9 Drawing Sheets

ANTIREFLECTION FILM

SCANNIING OPTICAL APPARATUS

BACKGROUND OF THE INVENTION

1. Field of the Invention

The present invention relates to a scanning optical apparatus and, more particularly, to a scanning optical apparatus, for example suitably applicable to apparatus such as laser beam printers (LBPs) or digital copiers, that is arranged to effectively intercept part of a laser beam from a light source means by a shade member having a shade portion formed in a predetermined shape, thereby decreasing the spot diameter, increasing the focal depth, and suppressing the negative effect of side lobe on an image.

2. Related Background Art

In the conventional scanning optical apparatus used in the laser beam printers, the digital copiers, or the like the laser beam (light beam) emitted from the light source means is optically modulated according to an image signal. Then the optically modulated laser beam is deflected on a periodic basis by a light deflector, for example comprised of a polygon mirror, and an imaging optical system having f-θ characteristics focuses the beam in a spot shape on a photosensitive recording medium. The beam thus scans the recording medium to effect image recording thereon.

Figure 1:
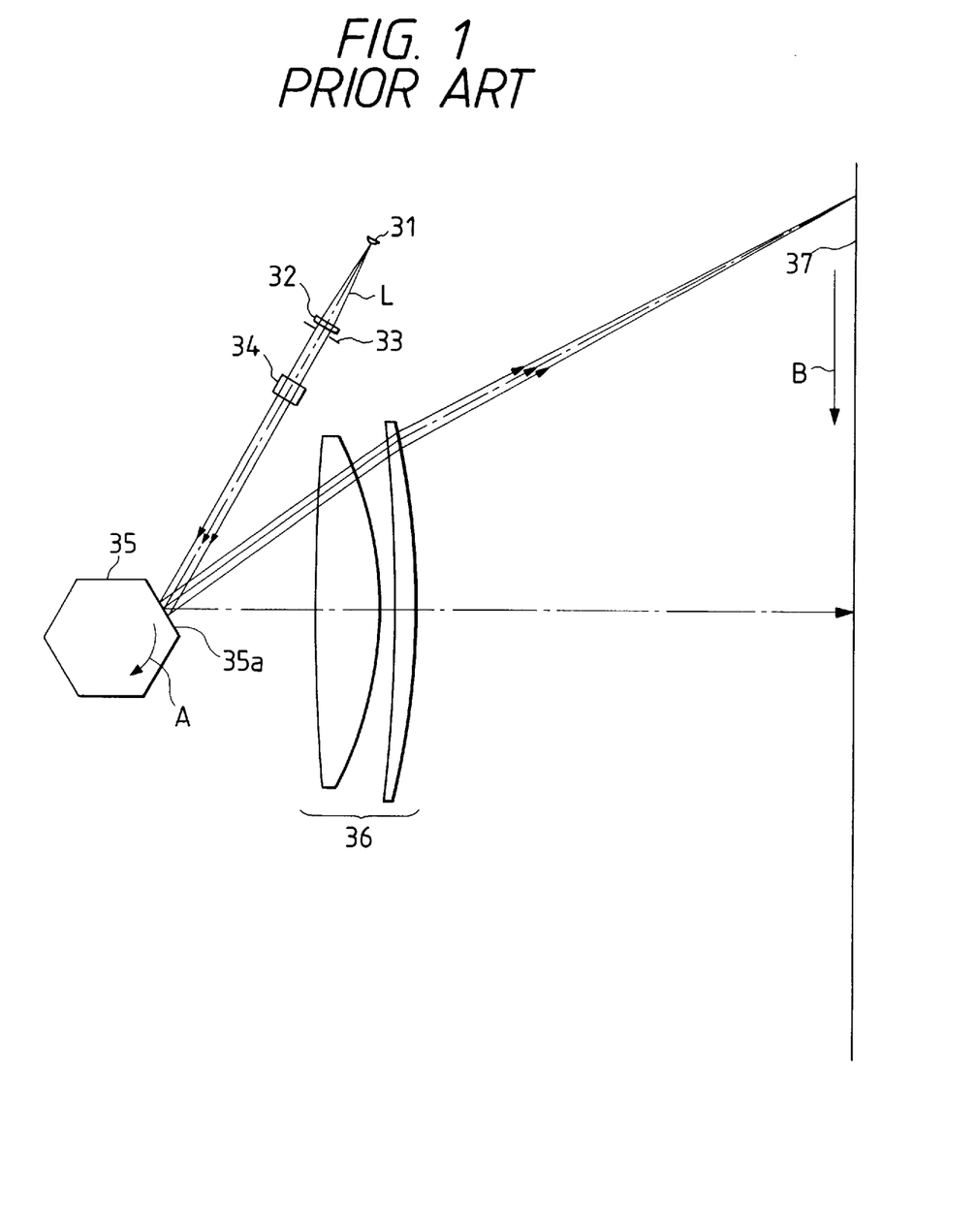
FIG. 1 is a schematic view of major part of an optical system of a conventional scanning optical apparatus.

FIG. 1 is a schematic view of major part in a main scanning cross section of a scanning optical apparatus of this type.

In the same drawing, the laser beam (light beam) L emitted from the light source means 31 is converted into a nearly parallel beam or into a converging beam by a collimator lens 32, a stop member 33 shapes the size of beam cross section of the beam, and the shaped beam is incident into a cylindrical lens 34. Among the parallel beam incident into the cylindrical lens 34, rays in the main scanning cross section are emergent in the state of parallel rays as they are. In the subsidiary scanning cross section perpendicular to the plane of FIG. 1 rays are converged to be focused as an almost linear image on a deflecting surface (or reflecting surface) 35a of the light deflector 35. After that, the laser beam deflected by the deflecting surface 35a passes through an imaging optical system (f-θ lens) 36 to be converged on a photosensitive drum surface 37, and the light deflector 35 is rotated in the direction of arrow A to effect optical scanning in the direction of arrow B (i.e., in the main scanning direction) on the photosensitive drum surface 37. This results in recording an image on the photosensitive drum surface 37 being a recording medium.

In these years, the laser beam printers, digital copiers, or the like are being required to achieve higher resolution and higher quality of image and, especially for meeting requirements for high resolving power and for tone reproduction affluent in half tones (intermediate tone levels), it is necessitated to further decrease the spot diameter on the photosensitive drum surface being a surface to be scanned.

Here, the above spot diameter d is expressed by the following equation.

$$d = \alpha F \lambda \quad (a)$$

In Eq. (a),
F: F-number of image-forming beam (optical system),
λ: wavelength of laser beam,
α: constant.

Therefore, in order to further decrease the spot diameter d, it is necessary to decrease the F-number of image-forming beam or to decrease the wavelength λ of laser beam, as seen from Eq. (a). However, a decrease in the F-number of image-forming beam will result in an increase in the beam width of laser beam L outgoing from the collimator lens 32. It thus becomes necessary to increase the effective diameter of collimator lens 32. Such a collimator lens has the problem of increase in the manufacturing cost, because the number of lenses used therein increases and because higher adjustment accuracy thereof is required.

In addition, since the width of the beam incident to the deflecting surface (reflecting surface) of light deflector 35 also becomes greater, the effective area of the deflecting surface must be increased, too. The manufacturing cost of such a light deflector increases and the weight of the light deflector itself also increases. Thus, a very large load is exerted on a motor for rotating the light deflector. This will result in such various problems as an increase in the cost of the motor and an increase in consumption power.

As for shortening of the wavelength λ of laser beam, the cost is normally still high of lasers creating visible light, which are used for some high-grade machines, but are not suitable for cheap laser beam printers.

On the other hand, the focal depth D of the laser beam focused in the spot shape on the photosensitive drum surface is expressed by the following equation.

$$D = \beta F^2 \lambda \quad (b)$$

In Eq. (b),
F: F-number of image-forming beam (optical system),
λ: wavelength of laser beam,
β: constant.

As seen from Eq. (b), the focal depth D tends to become smaller (shallower) as the F-number of image-forming beam is made smaller or as the wavelength λ of laser beam is made shorter in order to decrease the spot diameter. This necessitates decreasing the curvature of field of the f-θ lens (imaging optical system). As a result, design becomes complex and higher accuracy is required for processing of the f-θ lens itself. Further, higher assembly accuracy is necessitated for each optical component, which will result in a problem of a large increase in the cost.

In order to solve this problem, there are methods proposed, including a method for generating a Bessel beam of the first kind of order 0 to decrease the spot diameter and to increase the focal depth, for example as described in Japanese Laid-open Patent Application No. 5-307151 or in Japanese Laid-open Patent Application No. 6-148545, a method for intercepting the side-lobe part of an eccentric Bessel beam by a slit member, and so on.

Creation of the Bessel beam, however, required use of, for example, a conical prism and a phase/amplitude filter or the like, which tended to complicate the whole apparatus. The method for intercepting the side-lobe part of eccentric Bessel beam by the slit member tended to complicate adjustment.

SUMMARY OF THE INVENTION

An object of the present invention is to provide a scanning optical apparatus that can decrease the spot diameter and also increase the focal depth by providing a shade member having a shade portion of a predetermined shape (for example, a circle or an ellipse) around the optic axis in an optical path between the light source means and the deflecting means and that can obtain a high-quality image as controlling the subsidiary maximum distribution by properly setting the shape of the shade portion.

A scanning optical apparatus of the present invention for achieving the above object comprises:

light source means;

deflecting means for deflecting a beam emitted from said light source means;

optical means for guiding the beam emitted from said light source means to said deflecting means;

a stop member, provided in an optical path between said optical means and said deflecting means, for shaping a beam size of the beam having passed said optical means, said stop member having an aperture portion;

imaging means for guiding the beam deflected by said deflecting means onto a surface to be scanned; and a shade member, provided in the optical path between said stop member and said deflecting means, for intercepting a beam traveling in a central part of said stop member.

The scanning optical apparatus of the present invention is further characterized in that a shape of a shade portion of said shade member satisfies the following conditions:

$Ps(\text{eff}) < Pm(\text{eff}) + 0.2022/\{Pm(\text{eff}) + 0.1718\} - 0.1716$, $Pm(\text{eff}) < Ps(\text{eff}) + 0.2022/\{Ps(\text{eff}) + 0.1718\} - 0.1716$, $0 < Ps(\text{eff}) < 1$, and $0 < Pm(\text{eff}) < 1$, where Pm(eff) is an effective shade length ratio in a direction of deflection of said deflecting means with respect to the aperture portion of said stop member and Ps(eff) is an effective shade length ratio in a direction perpendicular to the direction of deflection of said deflecting means with respect to the aperture portion of said stop member.

The scanning optical apparatus of the present invention is further characterized in that said optical means converts the beam emitted from said light source means into a nearly parallel beam or into a converging beam.

The scanning optical apparatus of the present invention is further characterized in that said shade member is made by evaporation of a pattern on a glass member and is positioned as inclined with respect to a direction normal to the optic axis of said optical means.

The scanning optical apparatus of the present invention is further characterized in that said shade member is made by evaporation of a pattern on a glass member and an antireflection film is evaporated over a surface of said glass member.

The scanning optical apparatus of the present invention is further characterized in that said shade member is made by evaporation of a pattern on a glass member and is positioned as inclined with respect to a direction normal to the optic axis of said optical means and in that an antireflection film is evaporated over a surface of said glass member.

DETAILED DESCRIPTION OF THE PREFERRED EMBODIMENTS

Figure 2:
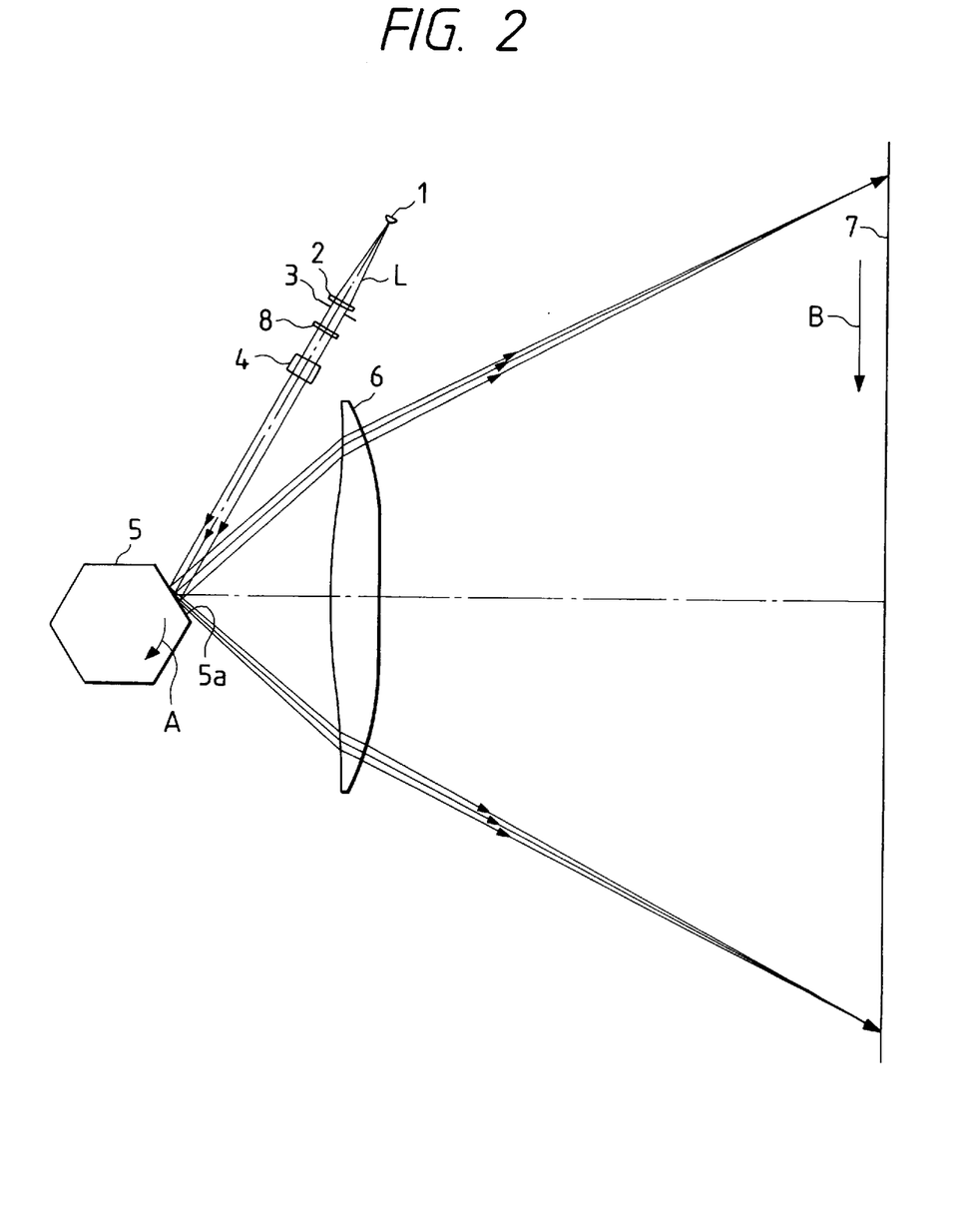
FIG. 2 is a schematic view of major part of an optical system of a scanning optical apparatus in Embodiment 1 of the present invention.

FIG. 2 is a schematic view of major part in the main scanning cross section of an optical system of a scanning optical apparatus used in a laser beam printer apparatus of Embodiment 1 of the present invention.

In the same drawing reference numeral 1 designates a light source means, which is comprised of, for example, a semiconductor laser. Numeral 2 denotes a collimator lens, which converts a laser beam (light beam) L emitted from the light source means 1 into a nearly parallel beam or into a converging beam. Numeral 3 represents a stop member (aperture stop), which has an aperture portion 3a formed in a shape described below and which shapes the size of cross section of the laser beam having passed through the collimator lens 2. Numeral 8 represents a shade member, which has a shade portion 8a made in a shape described below and which intercepts a part (the central part) of the laser beam, thereby decreasing the spot diameter and increasing the focal depth. This shade member 8 is made by evaporation of a pattern on a glass plate. Numeral 4 represents a cylindrical lens, which has predetermined refracting power only in the subsidiary scanning direction perpendicular to the plane of FIG. 2. Numeral 5 is a light deflector, which is comprised of, for example, a polygon mirror and which is rotated at constant speed in the direction of arrow A by a driving means (not illustrated) such as a motor. Numeral 6 stands for an imaging optical system (f-θ lens system) having the f-θ characteristics as an imaging means, which is comprised of a single lens and which focuses the laser beam deflected by the light deflector 5 on a photosensitive drum surface 7 as a surface to be scanned.

In the present embodiment the laser beam L emitted from the light source means 1 is converted into a nearly parallel beam or into a converging beam by the collimator lens 2, and the stop member (aperture stop) 3 beam-shapes the size of cross section of the beam in the direction of deflection in which the beam is deflected for scan by the light deflector 5 as described below (which will be referred to as the main scanning direction) and in the direction perpendicular thereto (which will be referred to as the subsidiary scanning direction). After that, the shade member 8 intercepts a part of the laser beam near the optic axis and the beam is then incident into the cylindrical lens 4. Among the parallel beam incident into the cylindrical lens 4 rays in the main scanning cross section are emergent in the state of parallel rays as they are. Further, rays in the subsidiary scanning cross section are converged to be focused as an almost linear image on the deflecting surface (reflecting surface) 5a of the light deflector 5. After that, the laser beam deflected by the deflecting surface 5a is condensed through the imaging optical system 6 onto the photosensitive drum surface 7, and the light deflector 5 is rotated in the direction of arrow A, thereby scanning the photosensitive drum surface 7 at constant speed in the direction of arrow B (i.e., in the main scanning direction). This permits an image to be recorded on the photosensitive drum surface 7 being a recording medium.

As described, the scanning optical apparatus of the present invention is a scanning optical apparatus arranged to convert the laser beam emitted from the light source means into the nearly parallel beam or into the converging beam by the collimator lens, to shape the beam size of the laser beam by the stop member having the aperture portion to guide the shaped beam through the cylindrical lens to the deflecting means, to guide the laser beam deflected by the deflecting means through the imaging means onto the surface to be scanned, and to scan the surface to be scanned by the beam, wherein the shade member having the shade portion for intercepting the central part of the laser beam is provided in the optical path between the light source means and the deflecting means.

Further, as described below, the shape of the shade portion is determined so as to properly set effective shade length ratios in the direction of deflection of the deflecting means and in the direction perpendicular to the direction of deflection with respect to the aperture portion of the stop member.

Figure 3:
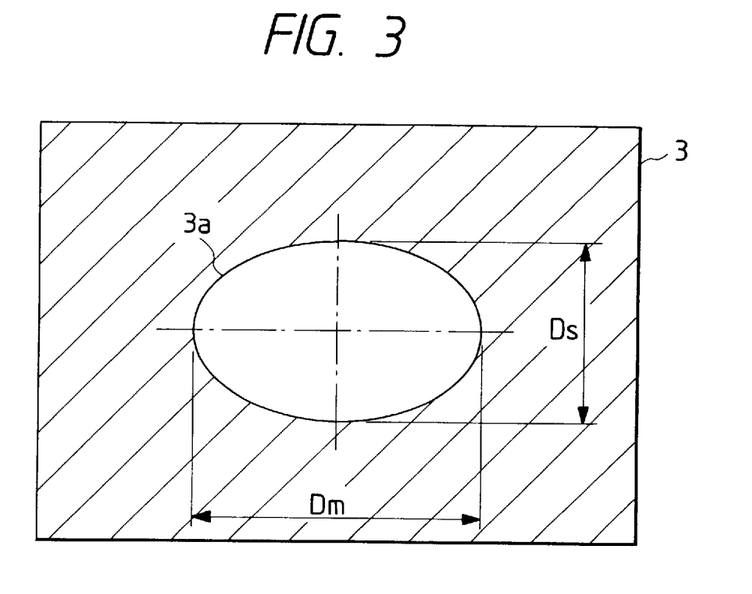
FIG. 3 is an explanatory drawing to show the shape of the aperture stop in Embodiment 1 of the present invention.

FIG. 3 is an explanatory drawing to show the shape of specific aperture portion 3a (stop shape) of the stop member (aperture stop) 3 shown in FIG. 2. This shape of aperture portion 3a is determined optionally according to the spot diameter on the photosensitive drum surface 7 and is normally circular, elliptic, or of an elongate oval. In the same drawing Dm is the length of the aperture portion in the main scanning direction and Ds the length thereof in the subsidiary scanning direction.

Figure 4:
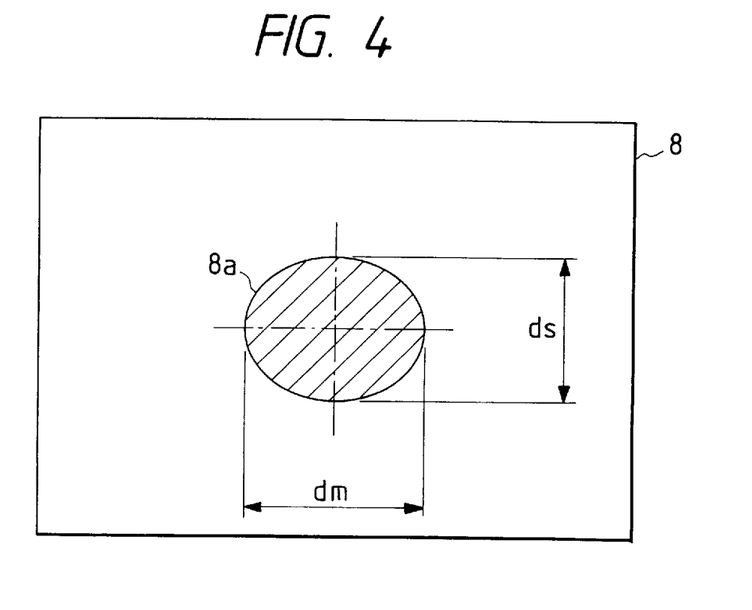
FIG. 4 is an explanatory drawing to show the shape of the shade portion in Embodiment 1 of the present invention.

FIG. 4 shows the shape of the shade portion 8a of the shade member 8 shown in FIG. 2. The shape of this shade portion 8a is, for example, of a circle or an ellipse around the optic axis, wherein when the length in the main scanning direction is dm and the length in the subsidiary scanning direction is ds, these lengths dm, ds are determined in the ranges to satisfy Condition Equations (1) as described hereinafter.

Figure 5:
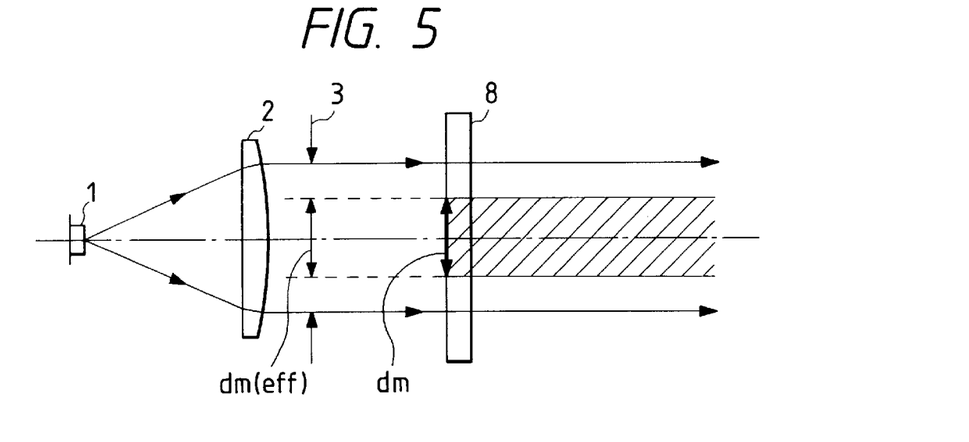
FIG. 5 is an explanatory drawing to show beam shaping by the shade portion in Embodiment 1 of the present invention.

FIG. 5 is a schematic view of major part in the main scanning cross section to show the state wherein the laser beam emitted from the light source means 1 is converted into the parallel beam by the collimator lens 2 and the parallel beam is shaped by the stop member 3 and shade member 8. In the same drawing the same elements as those shown in FIG. 2 are denoted by the same reference symbols.

In the same drawing dm(eff) represents the length in the main scanning direction of the shade portion 8a at the position of the stop member 3 and dm does the length in the main scanning direction of the shade portion 8a at the position of the shade member 8.

Figure 6:
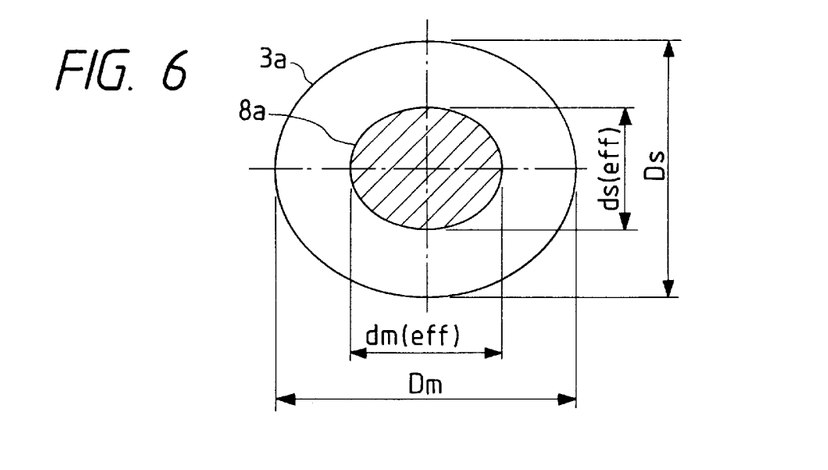
FIG. 6 is an explanatory drawing to show an effective shade shape at the position of the stop member in Embodiment 1 of the present invention.

FIG. 6 is an explanatory drawing to show the effective shade shape by the shade member 8 at the position of the stop member 3. In the drawing the same elements as those shown in FIG. 3 and FIG. 5 are denoted by the same reference symbols.

In the same drawing ds(eff) represents the length in the subsidiary scanning direction of the shade portion 8a at the position of the stop member 3.

When the shape of the shade portion 8a of the shade member 8 is defined with respect to the aperture portion 3a of the stop member 3 and when effective shade length ratios in the main scanning direction and in the subsidiary scanning direction are Pm(eff) and Ps(eff), respectively, the shade length ratios Pm(eff), Ps(eff) are defined as follows.

$$Pm(\text{eff}) = dm(\text{eff})/Dm$$

$$Ps(\text{eff}) = ds(\text{eff})/Ds$$

Figure 7:
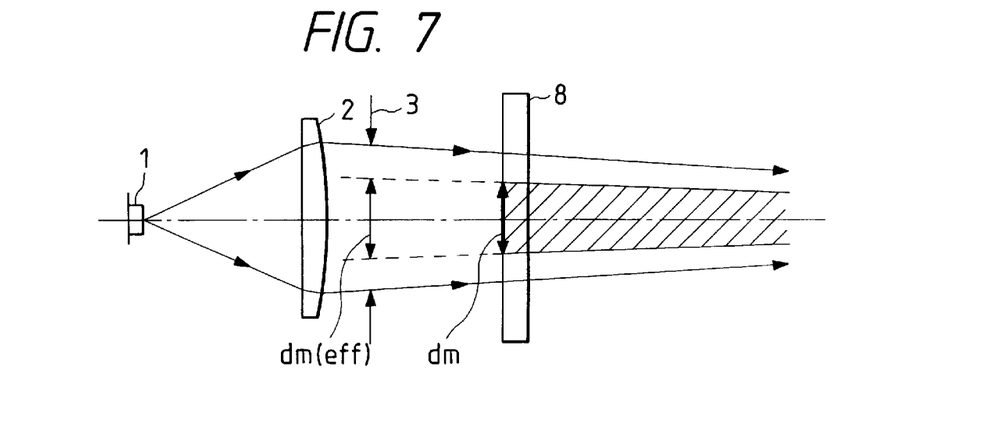
FIG. 7 is an explanatory drawing to show an effective shade shape where the beam from the collimator lens is a converging beam in Embodiment 1 of the present invention.

When the laser beam outgoing from the collimator lens 2 is a parallel beam as shown in FIG. 5, dm(eff)=dm and ds(eff)=ds. When the laser beam outgoing from the collimator lens 2 is a converging beam in the main scanning cross section as shown in FIG. 7, dm(eff)≠dm and ds(eff)≠ds.

By intercepting the laser beam passing the central portion of the stop member (aperture stop) 3 as described above, the spot diameter can be made smaller on the photosensitive drum surface 7 and the focal depth can be made larger (deeper).

Figure 8:
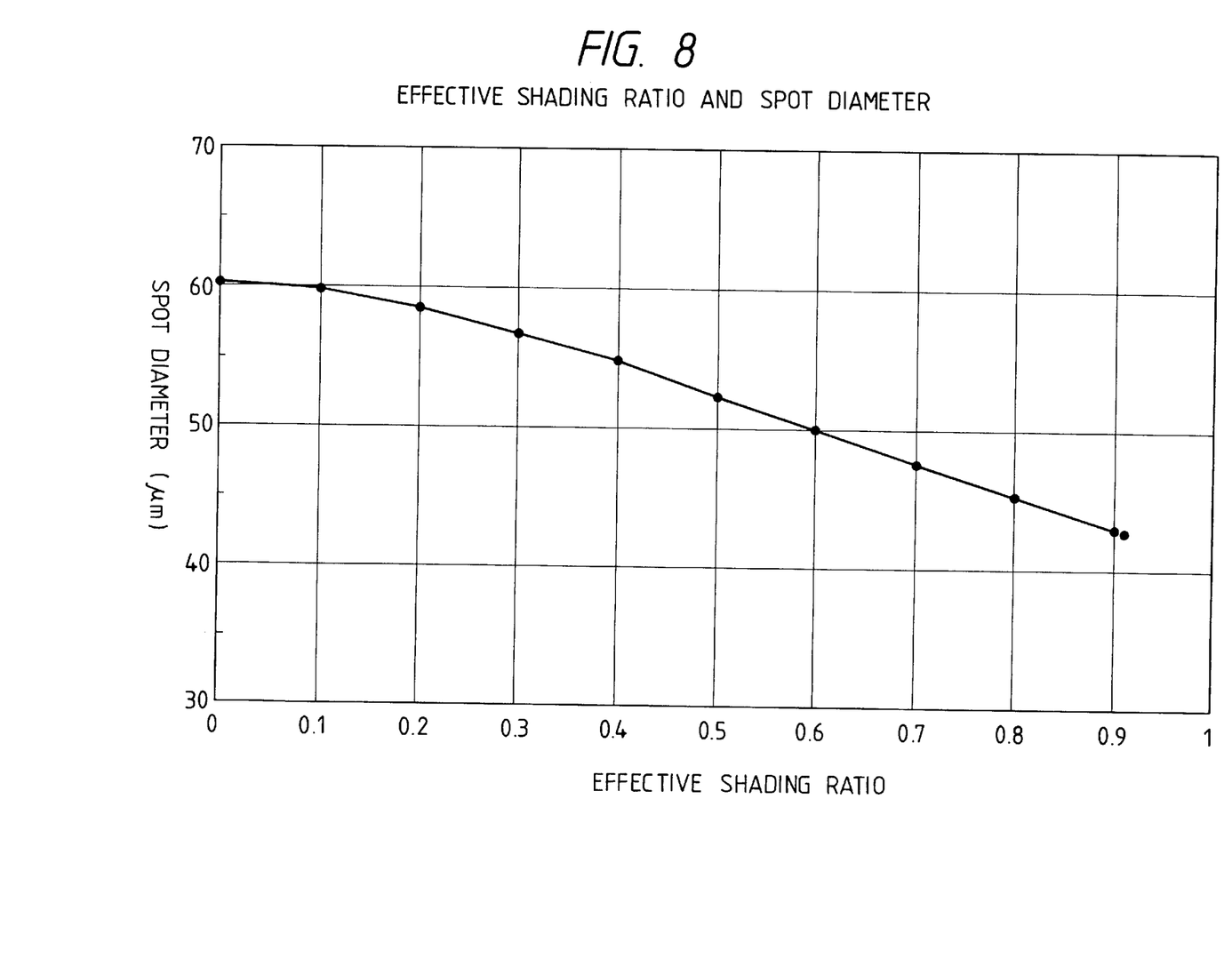
FIG. 8 is an explanatory drawing to show the relationship between effective shading ratio and spot diameter.
Figure 9:
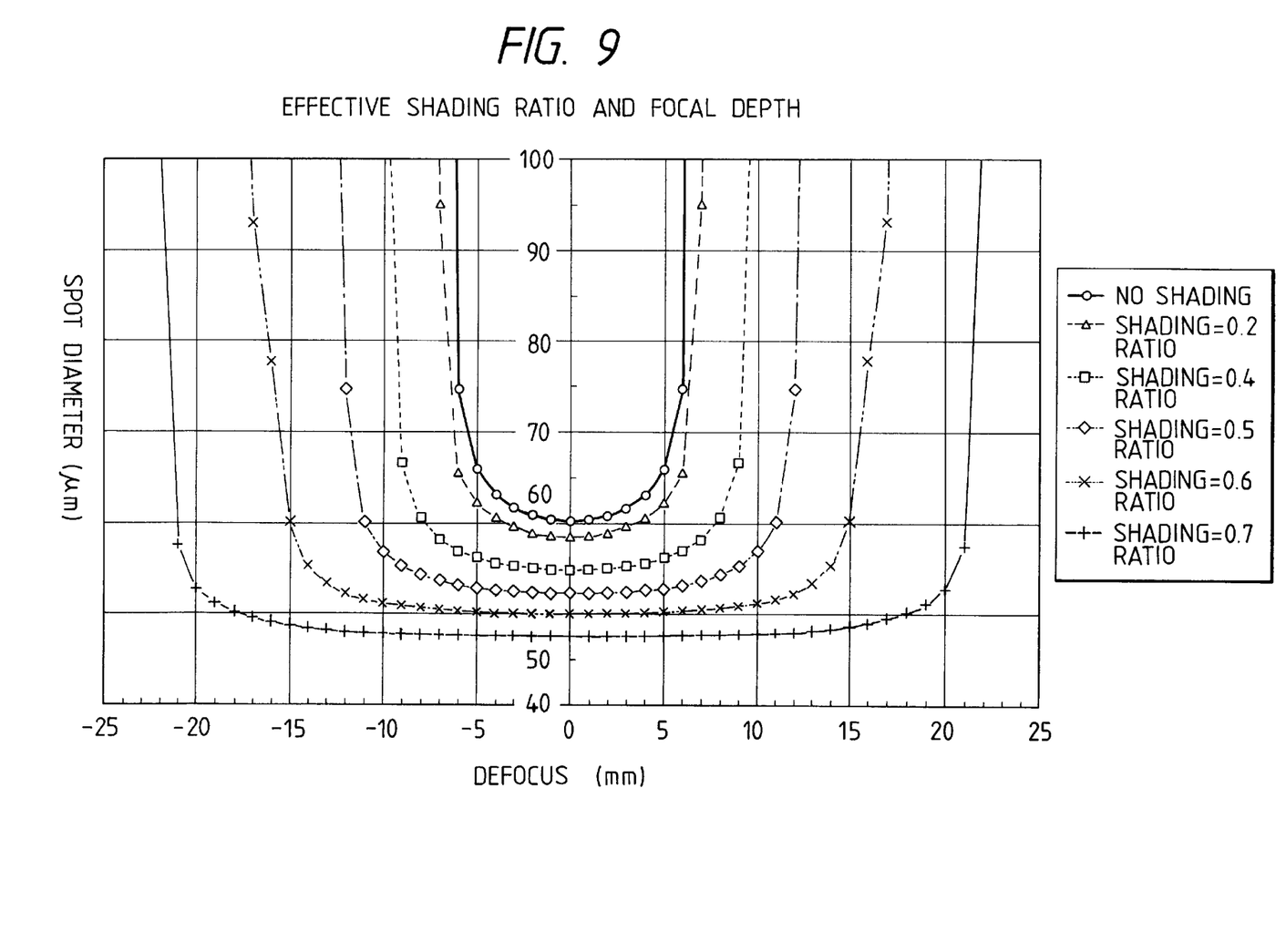
FIG. 9 is an explanatory drawing to show the relationship between effective shading ratio and focal depth.

For example, results of simulation carried out by the present inventor are illustrated as an example of the above in FIG. 8 and FIG. 9. For simplicity of description, the simulation was conducted under such an assumption that dm(eff)=ds(eff), i.e., that the effective shade length ratios in the main scanning direction and in the subsidiary scanning direction were equal.

FIG. 8 is an explanatory drawing to show how the spot diameter changes depending upon the effective shade length ratio Pm(eff) (=Ps(eff)). In this case, the spot diameter of diffraction limit with Pm(eff)=Ps(eff)=0 is set to be 60 μm. It is seen from the same drawing that the spot diameter can be made smaller with increasing effective shade length ratio.

FIG. 9 is an explanatory drawing to show how the focal depth changes depending upon the effective shade length ratio. It is seen from the same drawing that the focal depth becomes greater with increasing effective shade length ratio.

Figure 10:
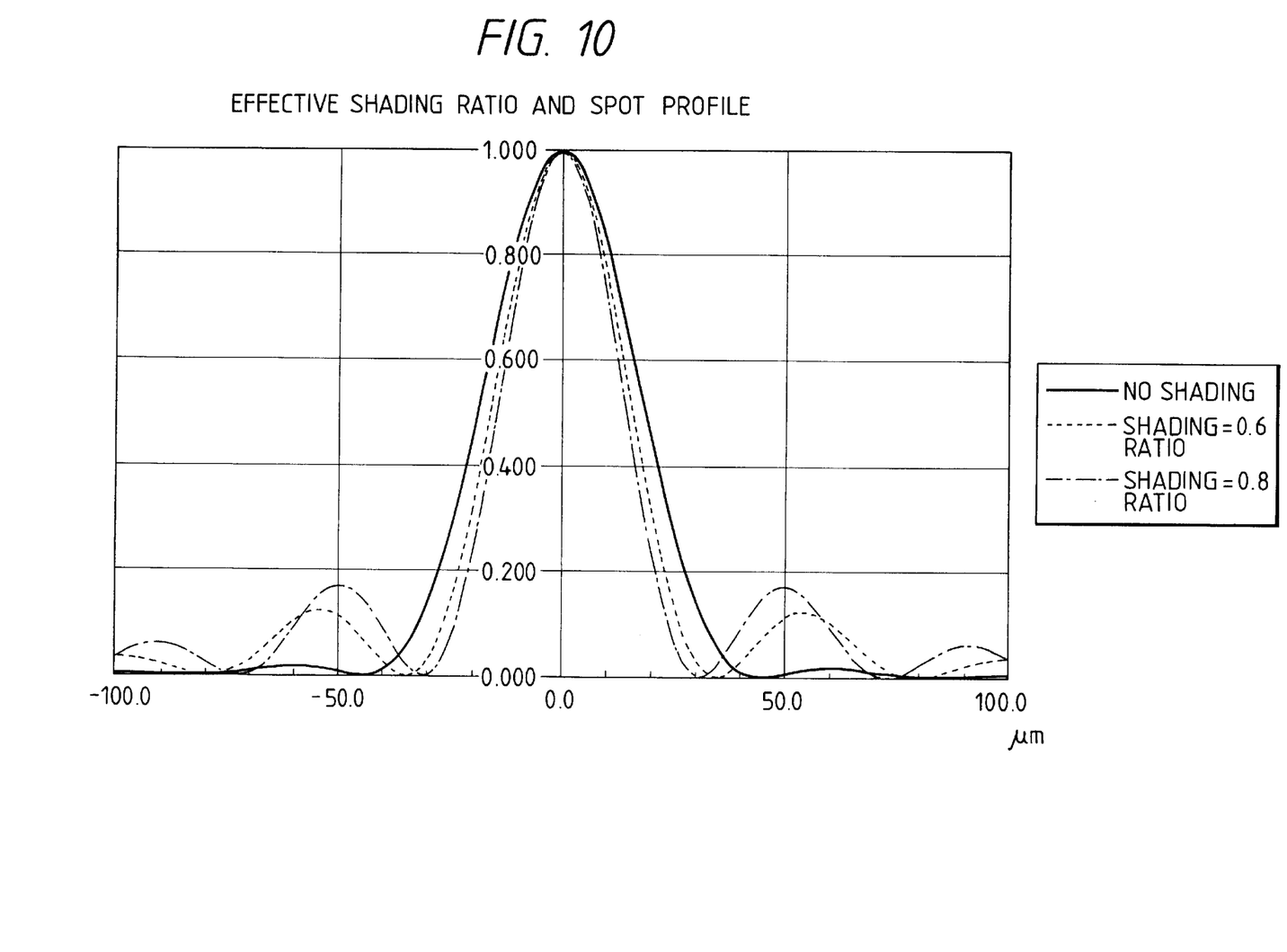
FIG. 10 is an explanatory drawing to show the relationship between effective shading ratio and spot profile.

On the other hand, it is known that the peak light quantity of side lobe (diffraction ring) increases with increasing effective shade length ratio. FIG. 10 is an explanatory drawing to show profiles (cross-sectional intensity distributions) of spot on the photosensitive drum surface 7 when no shade is placed (solid line), when the effective shade length ratio Pm(eff) (=Ps(eff)) is 0.6 (dotted line), and when the effective shade length ratio Pm(eff) (=Ps(eff)) is 0.8 (chain line). It is seen from the same drawing that the peak light quantity of side lobe increases with increasing effective shade length ratio.

This increase in the peak light quantity of side lobe would be a cause to give the negative effect on a drawing image, but the negative effect on the drawing image can be minimized by effectively making use of the nonlinearity in the electrophotographic process in the process of forming an electrostatic latent image on the photosensitive drum surface 7.

It would be, however, difficult to suppress the negative effective on the drawing image even with utilization of the method described above, for example if an extreme difference should exist between peak light quantities of side lobe in the main scanning cross section and in the subsidiary scanning cross section.

Specifically, when the peak light quantity of side lobe in the main scanning cross section is P(m) and when the peak light quantity of side lobe in the subsidiary scanning cross section is P(s) (provided that each of P(m) and P(s) is a value obtained by normalizing the peak light quantity of principal maximum by 1), the ratio of the peak light quantities is desirably within the following range.

$$0.5 < P(m)/P(s) < 2.0 \tag{2}$$

In the present embodiment the negative effect of side lobe on the drawing image can be suppressed effectively by setting the shape of the shade portion so that the effective shade length ratio Pm(eff) in the main scanning direction and the effective shade length ratio Ps(eff) in the subsidiary scanning direction satisfy four conditions (1a), (1b), (1c), (1d) represented by Condition Eqs. (1) below.

Eqs. (1):

$$Ps(\text{eff}) < Pm(\text{eff}) + 0.2022/\{Pm(\text{eff}) + 0.1718\} - 0.1716 \tag{1a}$$

$$Pm(\text{eff}) < Ps(\text{eff}) + 0.2022/\{Ps(\text{eff}) + 0.1718\} - 0.1716 \tag{1b}$$

$$0 < Ps(\text{eff}) < 1 \tag{1c}$$

$$0 < Pm(\text{eff}) < 1 \tag{1d}$$

Condition Eqs. (1) above concern the shape of the shade portion of the shade member, and aforementioned Condition Eq. (2) will not be satisfied if at least one of the four conditions (1a), (1b), (1c), (1d) in Condition Eqs. (1) is not met, which will make it difficult to suppress the negative effect on the drawing image and which is thus not preferred.

Figure 11:
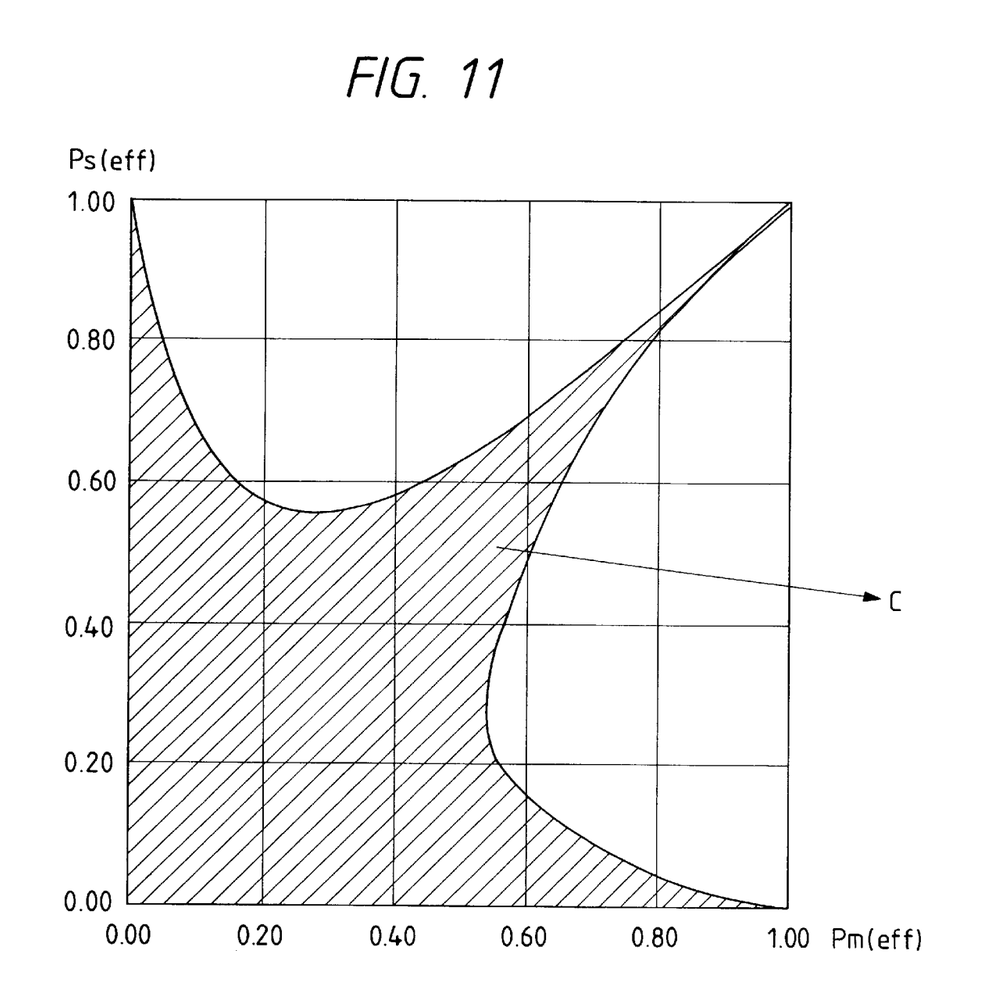
FIG. 11 is an explanatory drawing to show numerical ranges satisfying Condition Equations (1) of the present invention.

Region C of the hatched portion shown in FIG. 11 is a permissible range based on combination of the shade length ratio Pm(eff) with the shade length ratio Ps(eff) to satisfy above Condition Eqs. (1).

Figure 12:
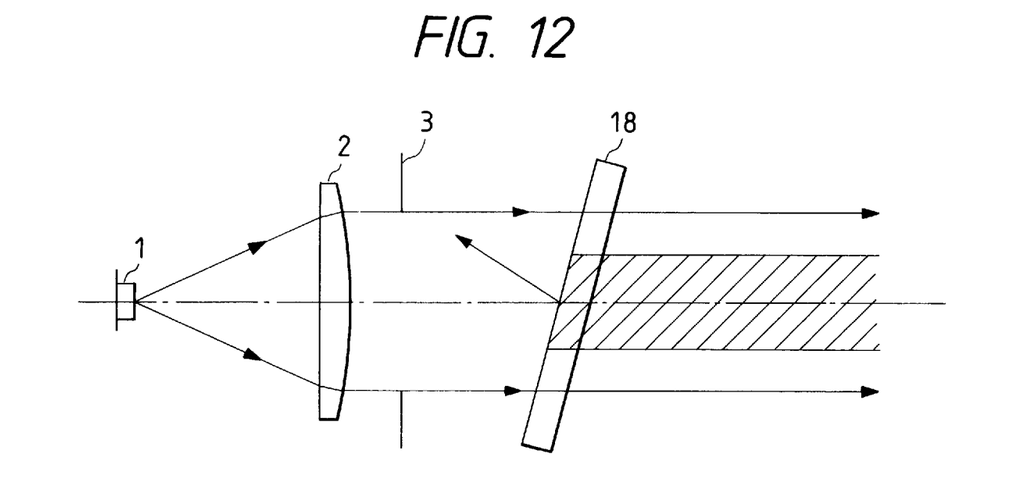
FIG. 12 is a major-part cross-sectional view of the main part of Embodiment 2 of the present invention.

FIG. 12 is a schematic view of major part in the main scanning cross section of the main part of Embodiment 2 of the present invention. In the same drawing the same elements as those shown in FIG. 2 are denoted by the same reference numerals.

The present embodiment is different from foregoing Embodiment 1 in that the shade member is positioned as inclined with respect to the direction normal to the optic axis of collimator lens 2. The other structure and optical action are substantially the same as in foregoing Embodiment 1, thereby achieving the same effect.

Specifically, in the same drawing reference numeral 18 designates the shade member made in the aforementioned shape, which is positioned as inclined in a predetermined direction with respect to the optic axis of collimator lens 2. Since this shade member 18 is made by evaporation of the pattern on the glass plate as described previously, light reflected by the surface of the glass plate could return to the semiconductor laser 1 and make the operation of the semiconductor laser 1 unstable.

In the present embodiment the shade member 18 is positioned as inclined in the predetermined direction with respect to the optic axis of collimator lens 2 in order to avoid it, thereby preventing the reflected light by the glass surface of the shade member 18 from returning to the semiconductor laser 1. This stabilizes the operation of semiconductor laser 1 in the present embodiment.

Figure 13:
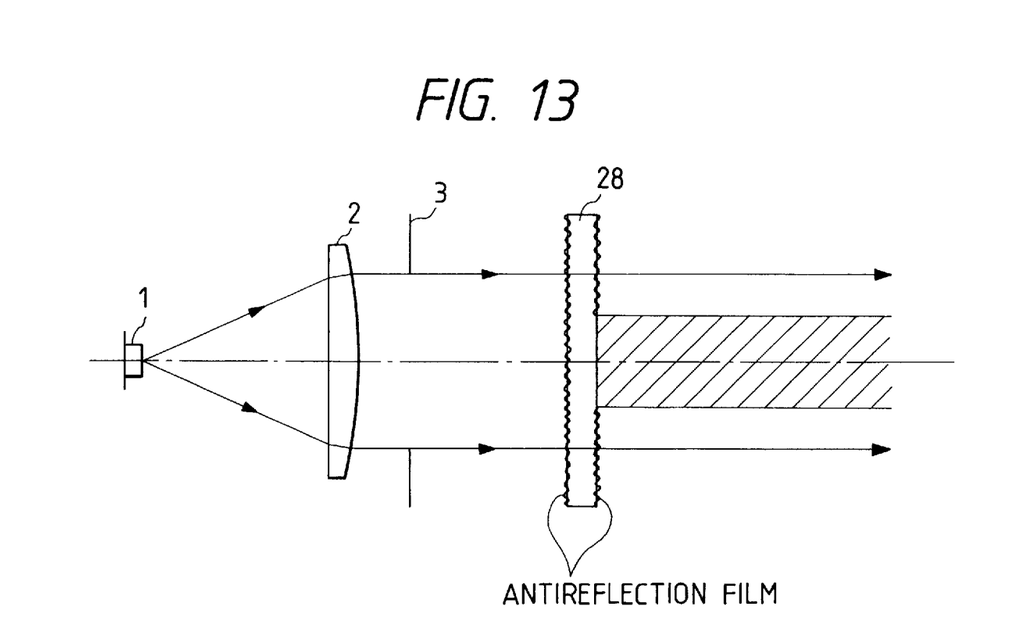
FIG. 13 is a major-part cross-sectional view of the main part of Embodiment 3 of the present invention.

FIG. 13 is a schematic view of major part in the main scanning cross section of the main part of Embodiment 3 of the present invention. In the same drawing the same elements as those shown in FIG. 2 are denoted by the same reference numerals.

The present embodiment is different from foregoing Embodiment 1 in that an antireflection film is evaporated over the glass surface of shade member 28. The other structure and optical action are substantially the same as in foregoing Embodiment 1, thereby achieving the same effect.

Specifically, in the same drawing reference numeral 28 designates the shade member made in the aforementioned shape and the antireflection film is evaporated over the glass surface of the shade member 28. Since the shade member 28 is made by evaporation of the pattern on the glass plate as described above, the reflected light from the glass plate surface could return to the semiconductor laser 1 and make the operation of semiconductor laser 1 unstable, similarly as in foregoing Embodiment 2.

Therefore, the present embodiment is configured in such an arrangement that the antireflection film is evaporated over the glass surface of the shade member 28 in order to avoid it, thereby preventing the reflected light from the glass surface of the shade member 28 from returning to the semiconductor laser 1. This stabilizes the operation of semiconductor laser 1 in the present embodiment.

It is noted that the shade member 28 of the present embodiment may be set as inclined with respect to the direction normal to the optic axis of collimator lens 2 as in forgoing Embodiment 2.

As described, the present invention includes such features that the shade member having the shade portion in the predetermined shape (for example, in the circular shape or in the elliptic shape) is provided between the light source means and the deflecting means and that the effective shade length ratios of the shade portion in the main scanning direction and in the subsidiary scanning direction are properly set so as each to satisfy foregoing Condition Eqs. (1), thereby achieving the scanning optical apparatus that has the decreased spot diameter, that has the deep focal depth, and that effectively suppresses the negative effect of side lobe on the image.

Since the present invention can decrease the spot diameter as described above, the invention attains the scanning optical apparatus suitable for high resolving power and for tone expression of half tones. In addition, since the focal depth can be made deeper, the invention achieves the scanning optical apparatus each optical component of which can be made at lower manufacturing accuracy and steps of assembly and adjustment of which can be simplified.

What is claimed is:

1. A scanning optical apparatus comprising:

light source means;

deflecting means for deflecting a beam emitted from said light source means;

optical means for guiding the beam emitted from said light source means to said deflecting means;

a stop member, provided in an optical path between said optical means and said deflecting means, for shaping a beam size of the beam having passed said optical means, said stop member having an aperture portion;

imaging means for guiding the beam deflected by said deflecting means onto a surface to be scanned; and a shade member, provided in the optical path between said stop member and said deflecting means, for intercepting a beam traveling in a central part of said stop member.

2. The scanning optical apparatus according to claim 1, wherein a shape of a shade portion of said shade member satisfies the following conditions:

$$Ps(\text{eff}) < Pm(\text{eff}) + 0.2022/\{Pm(\text{eff}) + 0.1718\} - 0.1716,$$

$Pm(\text{eff}) < Ps(\text{eff}) + 0.2022/\{Ps(\text{eff}) + 0.1718\} - 0.1716,$ $0 < Ps(\text{eff}) < 1,$ and $0 < Pm(\text{eff}) < 1,$ where Pm(eff) is an effective shade length ratio in a direction of deflection of said deflecting means with respect to the aperture portion of said stop member and Ps(eff) is an effective shade length ratio in a direction perpendicular to the direction of deflection of said deflecting means with respect to the aperture portion of said stop member.

3. The scanning optical apparatus according to claim 1, wherein said optical means converts the beam emitted from said light source means into a nearly parallel beam or into a converging beam.

4. The scanning optical apparatus according to claim 1, wherein said shade member is made by evaporation of a pattern on a glass member and is positioned as inclined with respect to a direction normal to the optic axis of said optical means.

5. The scanning optical apparatus according to claim 1, wherein said shade member is made by evaporation of a pattern on a glass member and an antireflection film is evaporated over a surface of said glass member.

6. The scanning optical apparatus according to claim 1, wherein said shade member is made by evaporation of a pattern on a glass member and is positioned as inclined with respect to a direction normal to the optic axis of said optical means and wherein an antireflection film is evaporated over a surface of said glass member.

7. A laser beam printer apparatus comprising:

light source means;

deflecting means for deflecting a beam emitted from said light source means;

optical means for guiding the beam emitted from said light source means to said deflecting means;

a stop member, provided in an optical path between said optical means and said deflecting means, for shaping a beam size of the beam having passed said optical means, said stop member having an aperture portion;

a recording medium;

imaging means for guiding the beam deflected by said deflecting means onto a surface of said recording medium; and a shade member, provided in the optical path between said stop member and said deflecting means, for intercepting a beam traveling in a central part of said stop member.

8. The laser beam printer apparatus according to claim 7, wherein a shape of a shade portion of said shade member satisfies the following conditions:

$Ps(\text{eff}) < Pm(\text{eff}) + 0.2022/\{Pm(\text{eff}) + 0.1718\} - 0.1716,$ $Pm(\text{eff}) < Ps(\text{eff}) + 0.2022/\{Ps(\text{eff}) + 0.1718\} - 0.1716,$ $0 < Ps(\text{eff}) < 1,$ and $0 < Pm(\text{eff}) < 1,$ where Pm(eff) is an effective shade length ratio in a direction of deflection of said deflecting means with respect to the aperture portion of said stop member and Ps(eff) is an effective shade length ratio in a direction perpendicular to the direction of deflection of said deflecting means with respect to the aperture portion of said stop member.

9. The laser beam printer apparatus according to claim 7, wherein said optical means converts the beam emitted from said light source means into a nearly parallel beam or into a converging beam.

10. The laser beam printer apparatus according to claim 7, wherein said shade member is made by evaporation of a pattern on a glass member and is positioned as inclined with respect to a direction normal to the optic axis of said optical means.

11. The laser beam printer apparatus according to claim 7, wherein said shade member is made by evaporation of a pattern on a glass member and an antireflection film is evaporated over a surface of said glass member.

12. The laser beam printer apparatus according to claim 7, wherein said shade member is made by evaporation of a pattern on a glass member and is positioned as inclined with respect to a direction normal to the optic axis of said optical means and wherein an antireflection film is evaporated over a surface of said glass member.

* * * * *

UNITED STATES PATENT AND TRADEMARK OFFICE
CERTIFICATE OF CORRECTION

PATENT NO. : 5,859,720

DATED : January 12, 1999

INVENTOR(S) : YOSHIHIRO ISHIBE

It is certified that error appears in the above-identified patent and that said Letters Patent is hereby corrected as shown below:

```
   Title page and
COLUMN 1,
Line 1, "SCANNIING" should read --SCANNING--.

COLUMN 8,
Line 25, "forgoing" should read --foregoing--.
```

Signed and Sealed this

Fourth Day of April, 2000

Attest:

Attesting Officer

Q. TODD DICKINSON

Director of Patents and Trademarks